US008749763B2

(12) United States Patent  (10) Patent No.: US 8,749,763 B2
Sakimura et al.  (45) Date of Patent: Jun. 10, 2014

(54) SURVEYING DEVICE AND COMMUNICATION SYSTEM FOR THE SAME

(75) Inventors: Ritsuo Sakimura, Tokyo (JP); Sora Otaguro, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 132 days.

(21) Appl. No.: 13/307,088

(22) Filed: Nov. 30, 2011

(65) Prior Publication Data
US 2012/0133918 A1 May 31, 2012

(30) Foreign Application Priority Data

Nov. 30, 2010 (JP) ................................ 2010-266574

(51) Int. Cl.
*G01C 3/08* (2006.01)
(52) U.S. Cl.
USPC .................. 356/4.01; 356/3.01; 356/5.01
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 2004/0234123 | A1* | 11/2004 | Shirai et al. .................. 382/154 |
| 2004/0254479 | A1* | 12/2004 | Fralick et al. ................ 600/477 |
| 2005/0168891 | A1 | 8/2005 | Nilman-Johansson et al. |
| 2006/0025894 | A1* | 2/2006 | O'Connor et al. ............... 701/1 |
| 2008/0218309 | A1 | 9/2008 | Steenstra et al. |

FOREIGN PATENT DOCUMENTS

| CN | 1914701 A | 2/2007 |
| CN | 101622894 A | 1/2010 |
| JP | H10-267656 A | 10/1998 |
| JP | 2003-016144 A | 1/2003 |
| JP | 2004-144681 A | 5/2004 |
| JP | 2008-102730 A | 5/2008 |
| JP | 2008-268004 A | 11/2008 |

OTHER PUBLICATIONS

Office Action issued in corresponding Chinese Application No. 201110391986.6 dated Jun. 21, 2013 (10 pages).
Wang et al., "Faults Analysis and Correction of Common Indicators of TOPCON GTS-332N Series Total Station." Geomatics & Spatial Information Technology, vol. 32, No. 5, Oct. 2009, pp. 163-165 (3 pages).
Office Action issued in corresponding Chinese Application No. 201110391986.6 dated Dec. 10, 2013 (8 pages).
Lu Huangli et al., "Fault Diagnosis & Telereference System (DTS) for Radar", China Academic Journal Electronic Publishing House, Dec. 31, 2007, pp. 95-97 (3 pages).
Office Action issued in corresponding Japanese Application No. 2010-266574 dated Apr. 22, 2014 (3 pages).

* cited by examiner

*Primary Examiner* — Luke Ratcliffe
(74) *Attorney, Agent, or Firm* — Osha Liang LLP

(57) ABSTRACT

A surveying device includes a surveying unit configured to measure a direction and a distance to a target object, a control unit configured to control the surveying unit, a communication unit configured to allow the control unit to communicate with an outside network, and a status input unit with which operation status information on the surveying unit is input, wherein the control unit transmits the operation status information input with the status input unit to the outside network via the communication unit.

7 Claims, 13 Drawing Sheets

SURVEYING DEVICE AND COMMUNICATION SYSTEM FOR THE SAME

CROSS REFERENCE TO RELATED APPLICATION

The present application is based on and claims priority from Japanese Patent Application No. 2010-266574, filed on Nov. 30, 2010, the disclosure of which is hereby incorporated by reference in its entirety.

BACKGROUND OF THE INVENTION

1. Field of the Invention

The present invention relates to a surveying device and a communication system including the surveying device.

2. Description of the Prior Art

In surveying, Japanese Patent Application Publication No. 2008-268004 discloses a total station which is configured to accurately measure a distance by emitting a pulsed laser beam to a point to be surveyed to receive pulsed light reflected therefrom, calculating a distance with every pulse and averaging the results, for example. Such a surveying machine may fail to properly measure a distance with a required accuracy because of various factors such as improper use or improper pre-setting of the machine, aging deterioration or change in the parts and settings, ambient environment, machine failures, or the combination of the above. It is important to accurately, quickly find the causes of a problem preventing proper surveying in terms of improving the quality of the surveying machine.

However, in a conventional surveying machine, manufacturers are unable to know what goes wrong with a machine until the machine in question is sent to them for inspection or they receive inquiries about problems or failures from users.

Moreover, for examining the surveying machine, it is necessary to find the troubles or failures in the parts of the machine or reproduce the situation in which a failure in surveying a target has occurred. When the failure occurs from various complicated factors, it is very hard to specify the causes of the failure in a different environment or condition from the one in which the failure has actually occurred.

Further, some surveying machine can generate and read an error log as a record of errors in a computer system. However, the error log does not always lead to specifying the causes of a problem. Thus, the surveying machine has a room for improvement in terms of accurately and quickly finding the causes of a problem in surveying.

SUMMARY OF THE INVENTION

The present invention aims to provide a surveying device which can quickly and accurately find the causes of a problem in surveying a target.

According to one aspect of the present invention, a surveying device comprise a surveying unit configured to measure a direction and a distance to a target object, a control unit configured to control the surveying unit, a communication unit configured to allow the control unit to communicate with an outside network, and a status input unit with which operation status information on the surveying unit is input, wherein the control unit transmits the operation status information input with the status input unit to the outside network via the communication unit.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Hereinafter, embodiments of the surveying device and a communication system for the surveying device according to the present invention will be described in detail with reference to the accompanying drawings. Wherever possible, the same reference numbers will be used throughout the drawings to refer to the same or like parts.

First Embodiment

Figure 1:
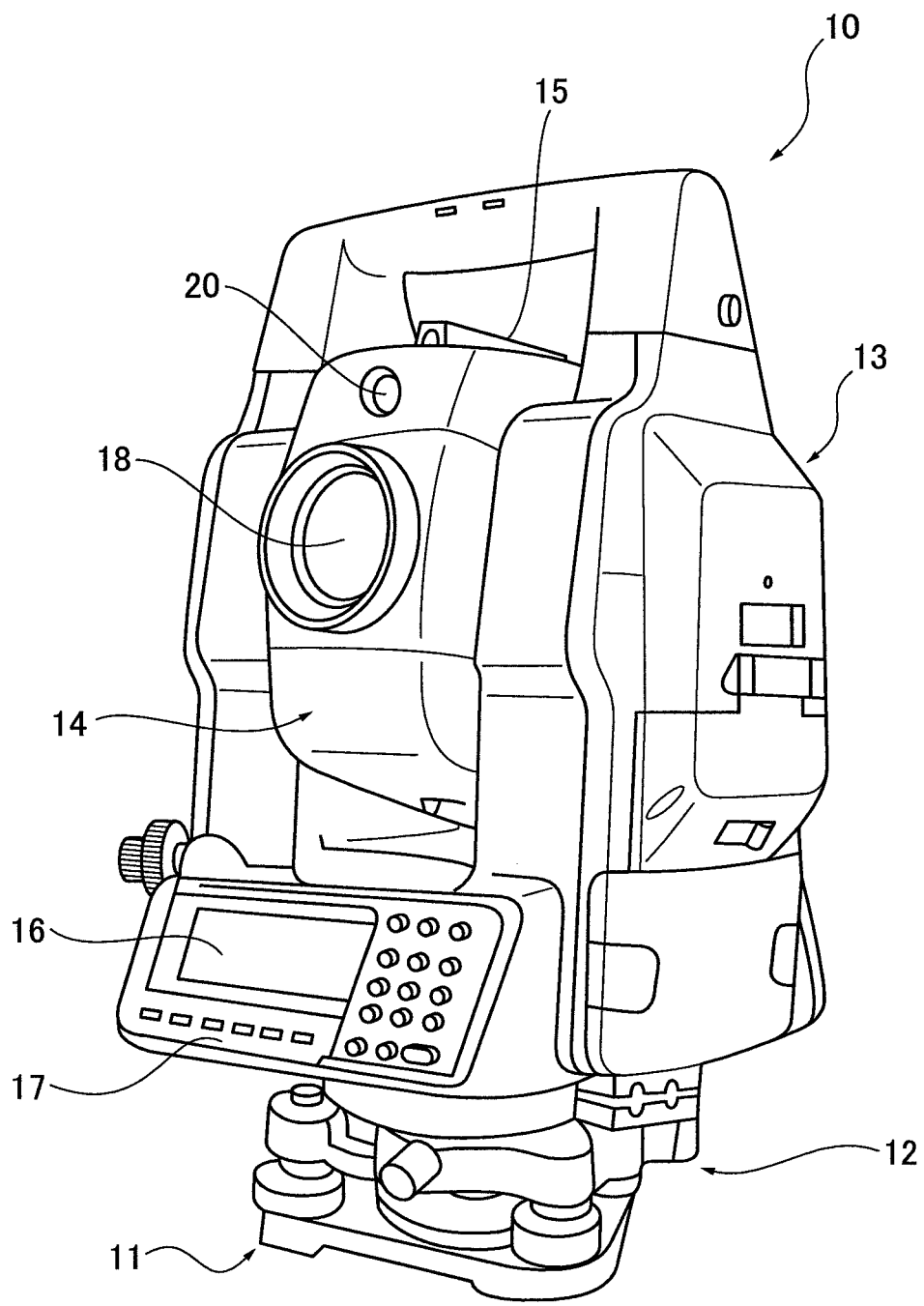
FIG. 1 shows an example of a surveying device 10 according to one embodiment of the present invention.
Figure 2:
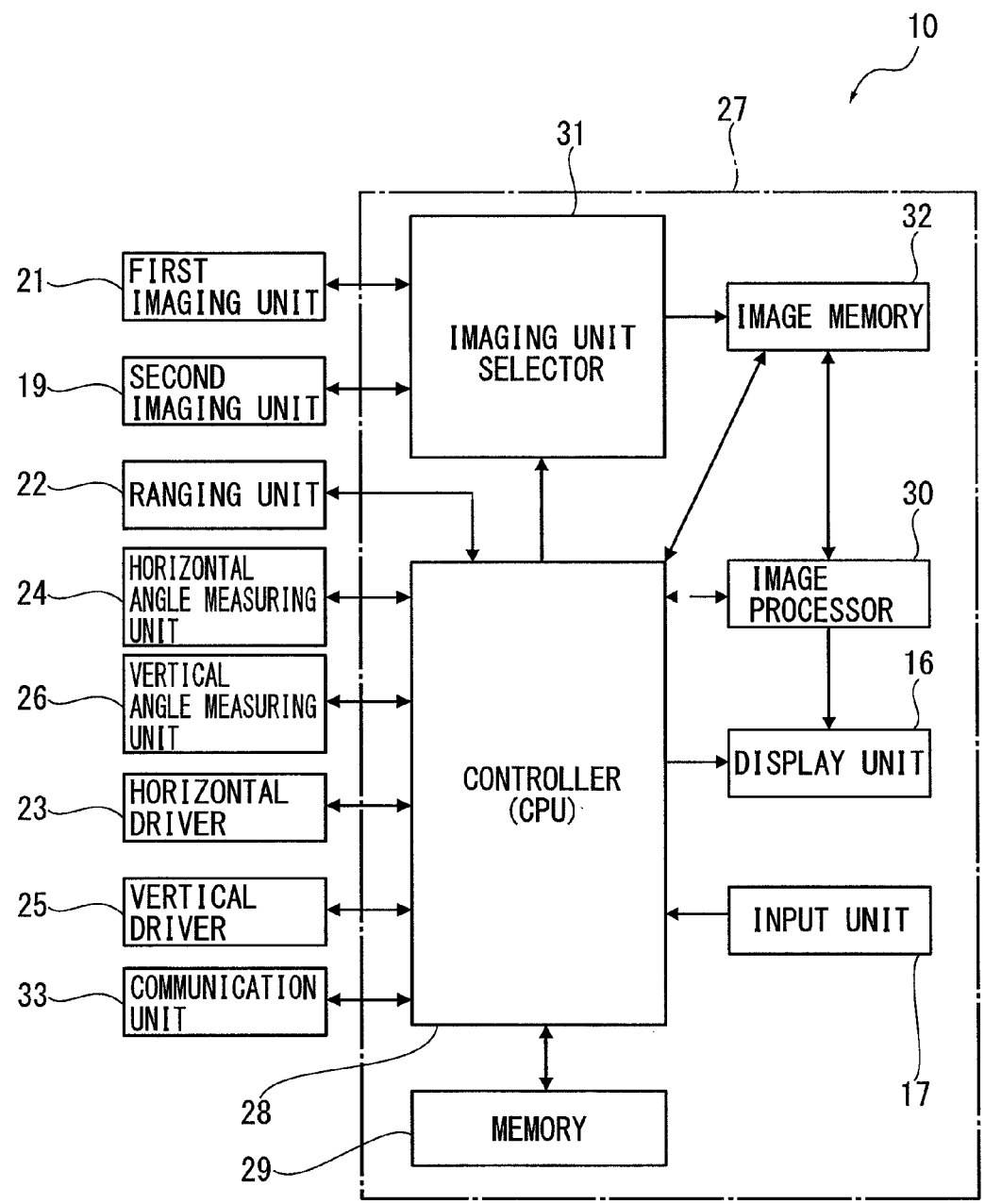
FIG. 2 is a block diagram showing the structure of the surveying device 10 in FIG. 1.

First, the schematic structure of a surveying device according to a first embodiment is described. FIG. 1 is a perspective view of a surveying device 10 by way of example. FIG. 2 is a block diagram of the function of the surveying device 10.

The surveying device 10 in FIGS. 1 to 2 is a total station which can accurately measure a distance to a target object by emitting a pulsed laser beam to the target object to receive pulsed light reflected therefrom, calculating a distance with every pulse and averaging the results. The surveying device 10 includes a leveling unit 11, a base 12, a mounting bracket 13, and a telescopic unit 14.

The leveling unit 11 is mounted on a not-shown tripod to detect the inclination of the surveying device 10 or telescopic unit 14. The base 12 is provided on the leveling unit 11 to be able to change an inclination angle relative to the leveling unit 11. The mounting bracket 13 is provided on the base 12 to be rotatable around the vertical axis, and includes a display unit 16 and an input unit 17. The input unit 17 is manipulated by a user to operate various functions of the surveying device 10 and outputs input data to a control unit 27 (FIG. 2).

The telescopic unit 14 is held by the mounting bracket 13 to be rotatable around the horizontal axis, and it includes a sight 15 to set the collimation direction of the surveying device 10, a second telescope 18 to collimate a target object, and a second imaging unit 19 to acquire a telephoto image in the collimation direction via the optical system of the second telescope 18. Further, the telescopic unit 14 includes a first telescope 20 having a wider field of view at a lower magnification than the second telescope 18 and a first imaging unit 21 (FIG. 2) to acquire a wide-angle image in the collimation direction via the optical system of the first telescope 20. The first imaging unit 21 and the second imaging unit 19 can be a digital camera to output a captured image as a digital image signal, for example. The telescopic unit 14 incorporates a ranging unit 22 which shares the optical system of the second telescope 18. The ranging unit 22 is configured to emit a laser beam to a target object and receive light reflected from the target to optically measure a distance to the target.

The mounting bracket 13 rotatably holding the telescopic unit 14 around the horizontal axis includes a horizontal driver 23 and a horizontal angle measuring unit 24. The horizontal driver 23 is configured to rotate the mounting bracket 13 relative to the base 12 around the vertical axis or in horizontal direction. The horizontal angle measuring unit 24 is configured to detect the horizontal angle in the collimation direction by detecting the horizontal angle of the mounting bracket 13 relative to the base 12.

Further, the mounting bracket 13 includes a vertical driver 25 and a vertical angle measuring unit 26 (FIG. 2). The vertical driver 25 is configured to rotate the telescopic unit 14 relative to the mounting bracket 13 around the horizontal axis or in vertical direction. The vertical angle measuring unit 26 detects the vertical angle in the collimation direction by detecting the vertical angle of the telescopic unit 14 relative to the mounting bracket 13.

Further, the mounting bracket 13 incorporates the control unit 27 configured to control the horizontal and vertical drivers 23 and 25 to properly rotate the mounting bracket 13 and the telescopic unit 14, respectively, thereby directing the telescopic unit 14 to a predetermined direction and moving it in a predetermined area. Also, the control unit 27 switchably controls the first telescope 20 and the second telescope 18 to acquire images with a required magnification. It controls the ranging unit 22 to measure a distance to a certain point to be surveyed. Thus, the leveling unit 11, base 12, mounting bracket 13, telescopic unit 14, sight 15, ranging unit 22, horizontal driver 23, horizontal angle measuring unit 24, vertical driver 25, vertical angle measuring unit 26, first telescope 20 or first imaging unit 21, and second telescope 18 or second imaging unit 19 constitute a surveying unit controlled by the control unit 27.

The control unit 27 in FIG. 2 includes the display unit 16, input unit 17, controller 28, a memory 29, an image processor 30, an imaging unit selector 31, an image memory 32 and a communication unit 33.

The controller 28 is configured to integrally control the operation of the control unit 27 by a program stored in the memory 29. The memory 29 contains various programs such as calculation program for distance measurement, image processing program, data generation program to generate transmission data of the surveying device, and data transmission program. The transmission data of the surveying device is stored in the memory 29, displayed on the display unit 16, and transmitted to an outside network (main server 42 as later described) via the communication unit 33 when appropriate.

The transmission data of the surveying device includes operation status information, operation information, and basic information. The operation status information refers to data indicating the operation state of the surveying unit input from an operation status input unit (input unit 17 or display unit 16 in the present embodiment) or the operation state or cooperation state of the respective surveying parts and elements, processing details of later-described self maintenance check aid function (FIGS. 5, 6), troubleshooting aid function (FIGS. 7, 9), and questionnaire creation aid function (FIG. 8).

The operation information includes the operation details of the surveying device 10, the operations or detected values of the respective units of the surveying device 10, error data on the respective units, operating time data, end else. The error data indicates operation failures in the surveying device 10 or respective units, set values exceeding their allowable ranges, or the like. It is generated every time the occurrence of such an error is detected by detectors in the device. The operating time data is generated along with turning-on/off of the power supply of the surveying device 10. Thus, the control unit 27 or controller 28 functions as an operation information acquiring unit in cooperation with the detectors.

The basic information refers to identification data of the surveying device 10, atmosphere data such as temperature, humidity in a place where the surveying device 10 is used, position information, version data of software applied to the surveying device 10, and else. The position information is generated by GPS function incorporated in the device.

The output values of the ranging unit 22, horizontal angle measuring unit 24, and vertical angle measuring unit 26 are input to the controller 28 for distance measurement. The controller 28 measures or calculates a distance, high and low angles, and horizontal angle on the basis of the output values and stores resultants in the memory 29 and displays them on the display unit 16. The resultants are transmitted to an outside network or a later described main server 42 via the communication unit 33.

The imaging unit selector 31 selects either of the first and second imaging units 21, 19. The images captured by either the first or second imaging unit 21, 19 are stored in the image memory 32 and displayed on the display unit 16. The image processor 30 performs image processing on the images stored in the image memory 32, for example, ones captured by the first imaging unit 21, stores them again in the image memory 32, and displays them on the display unit 16.

The communication unit 33 allows the device 10 to communicate with the outside network and transmits various types of information stored in the memory 29 under the control of the control unit 27 when appropriate. In the present embodiment the control unit 27 or controller 28 is configured to perform wireless data communication with the main server 42 and the communication unit 33 is adapted for wireless communication. The communication unit 33 is made up of a PHS (Personal Handy-phone System) modem.

Second Embodiment

Figure 3:
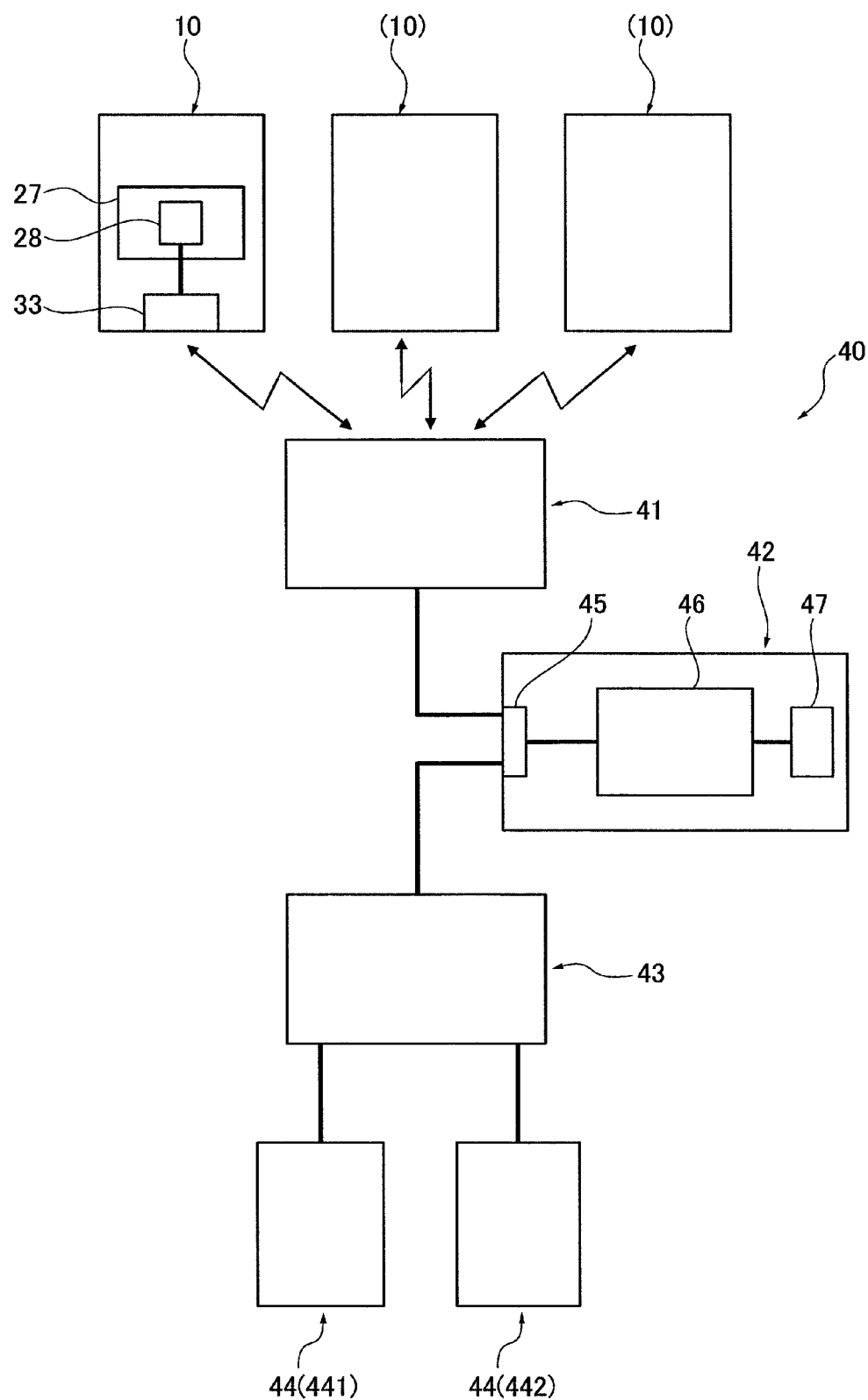
FIG. 3 schematically shows the structure of a communication system 40 for a surveying device according to one embodiment of the present invention.

The structure of a communication system for a surveying device according to a second embodiment of the present invention is described. The communication system 40 is applied for plural surveying devices indicated by a numeral code (10) as shown in FIG. 3. Here, only a single surveying device 10 is described for the sake of simplicity.

The communication system 40 includes a communication unit 41, the main server 42, a web server 43, and terminals 44 in addition to the surveying device 10, which are network-connected.

The communication unit 41 establishes wireless communication between the communication unit 33 of the surveying device 10 and the main server 42 in the present embodiment. The communication unit 41 includes not-shown base stations and communication carriers connected to the base stations. Upon receiving a communication start request from the communication unit 33, it establishes communication with a party matching with a verification result and allows the communication unit 33 to receive or transmit data from/to the party. In the present embodiment the communication unit 33 of the surveying device 10 is associated with the main server 42 to transmit data to the main server 42. Thus, the communication unit 41, the main server 42 and the web server 43 function as the outside network communicable with the control unit 27 or controller 28 via the communication unit 33.

The main server 42 includes an input/output port 45, a main server controller 46, and a main server memory 47. The input/output port 45 is for data communication with the communication unit 33 or the control unit 27 of the surveying device 10. The main server controller 46 is operated by a program stored in the main server memory 47 and functions to generate device data on the basis of information or signals transmitted from the device via the communication unit 33, store the device data in the main server memory 47, and restrict, in cooperation with the web server 43 or a web server controller, an accessible area of the device data stored in the main server memory 47 for each terminal 44. The device data is transmission data associated with the identification data of the surveying device 10 as a sender. Further, to restrict an accessible area of the device data refers to deciding accessible or non-accessible areas in all the device data stored in the memory 47 for each terminal 44.

The main server memory 47 contains the program for operating the main server controller 46 and the device data generated by the main server controller 46 are stored therein sequentially. Each terminal 44 can acquire the device data therefrom via the web server 43 when needed.

The web server 43 includes a not-shown controller which operates by a program stored in a web memory. It functions to allow an accessing terminal 44 to display a menu screen 61 (FIG. 4), and restrict, in cooperation with the main server controller 46, an accessible area of the device data stored in the main server memory 47 for each terminal 44. The web server 43 or web controller sets device data group accessible by an accessing terminal 44 on the basis of identification data of the terminal 44 in question and allow the terminal 44 to display the device data group. Thus, the web server 43 functions as a data area setting unit in cooperation with the main server controller 46.

The menu screen 61 is to allow a user to designate a product he or she wishes to check or to select specific items of the device data of the designated product. The menu screen 61 in FIG. 4 includes buttons and columns such as a product designation 62, execution button 63, item selection 64, and item display 65 in the present embodiment.

Figure 4:
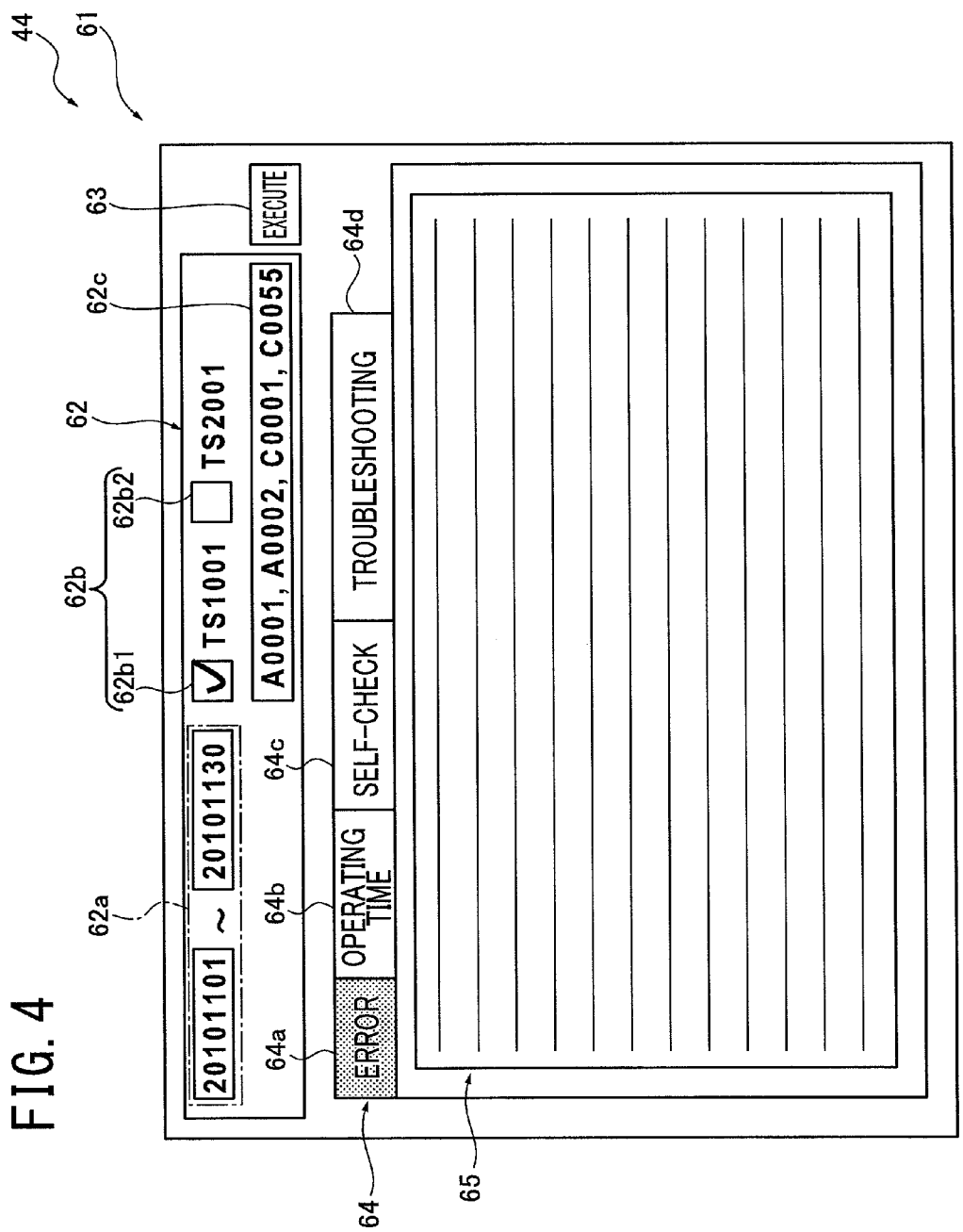
FIG. 4 shows a screen display 61 of a terminal 44.

The product designation 62 is to allow the user to designate a product he or she wants to check, and includes a production period column 62a, a product designation column 62b, and a stock number column 62c by way of example. The production period is designated by inputting a start date and an end date to the production period column 62a. The product designation column 62b includes two columns 62b1, 62b2 to select one from two products as shown in FIG. 4. A desired stock number can be input to the stock number column 62c. Alternatively, the production period column 62a and the stock number column 62c can be configured to select one from a list and the production designation column 62b can be configured that product codes or numbers are input thereto.

The execution button 62 is to execute acquiring of the device data of the item designated in the product designation 62. By operating the execution button 62 after setting an item in the product designation 62, the device data of the item in question is acquired.

The item selection 64 is to select a desired item to check from the acquired device data and includes an error button 64a, an operating time button 64b, a self-check button 64c, and a troubleshooting button 64d by way of example.

The error button 64a is to display accumulated error data on the selected surveying device as operation information. The operating time button 64b is to display operating time data on the selected surveying device as operation information. The operating time data can be a one-time operating time or a total operating time which are selectively or concurrently displayed on the item display 65.

The self-check button 64c is to display accumulated self maintenance check data indicating the processing details of self maintenance check aid function, which will be described in detail later.

The troubleshooting button 64d is to display accumulated troubleshooting data indicating the processing details of troubleshooting aid function, which will be described in detail later. Although not shown, a questionnaire button can be additionally provided to display accumulated questionnaire data indicating the processing details of questionnaire creation aid function.

The item display 65 displays an item selected by the item selection 64 from the acquired device data when appropriate. The display can be properly arranged to be easy to see in accordance with an item selected, for example, by displaying all items of the device data for each surveying device or displaying error data in chronological order.

Next, the self maintenance check aid function and the troubleshooting aid function of the surveying device 10 are described. Both functions are executed upon a user's request. Following the procedures of the aid functions, the user is requested to select certain items or input numbers or texts on the display unit 16. The user's selection or input can be made with the input unit 17 or directly by a touch panel on the display unit 16. Thus, either or both of the input unit 17 and the display unit 16 function(s) as an operation status input unit.

Figure 5:
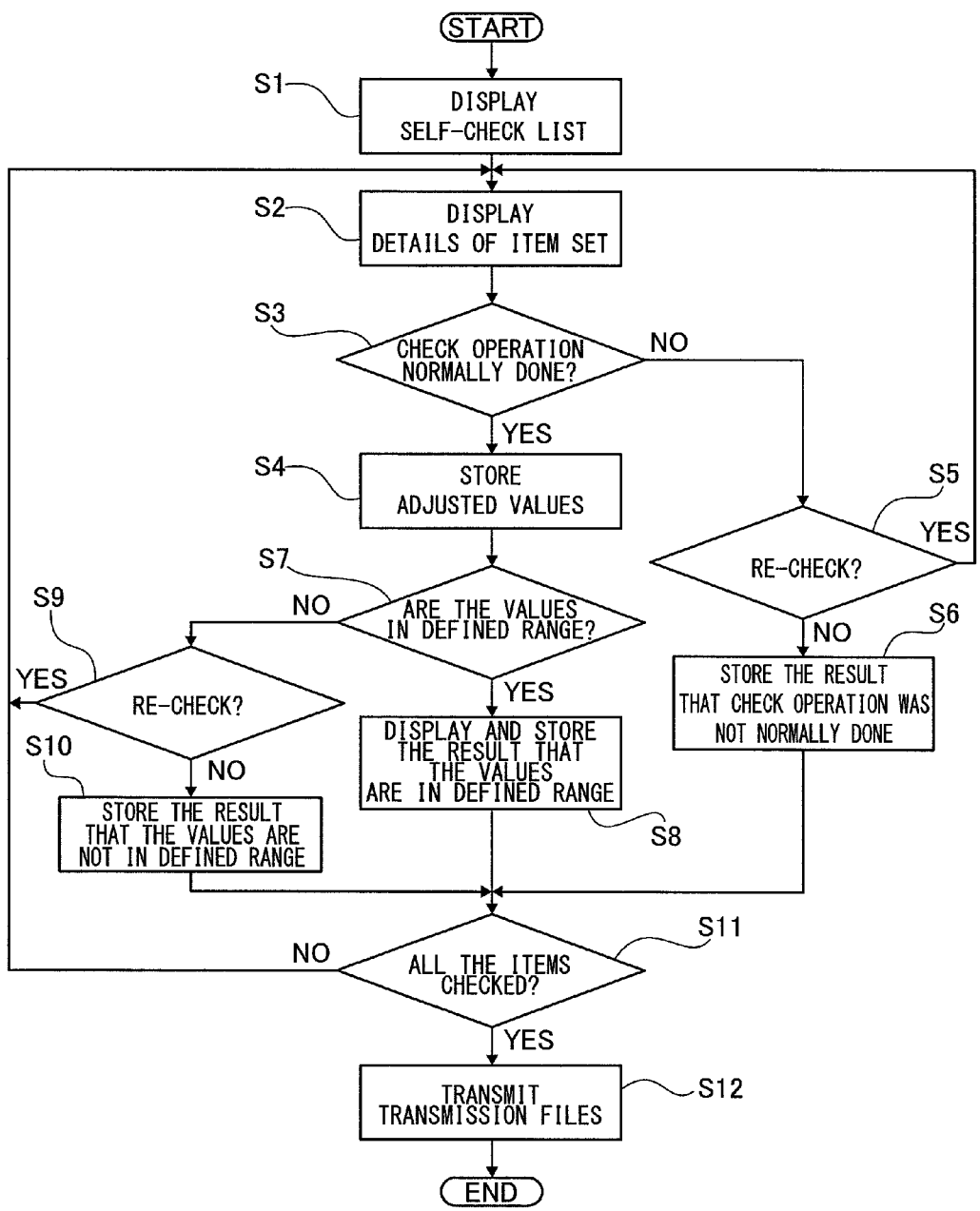
FIG. 5 is a flowchart for self maintenance check operation executed by a controller 28.
Figure 6A:
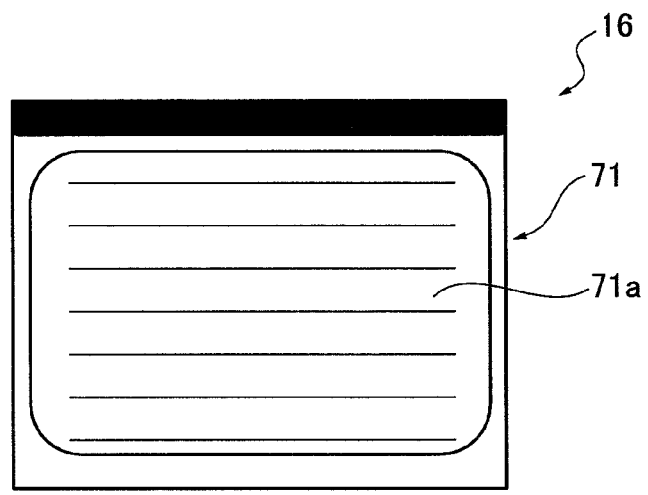
FIG. 6A shows the maintenance items on a display unit 16 and FIG. 6B shows the details and results of the self maintenance check.
Figure 6B:
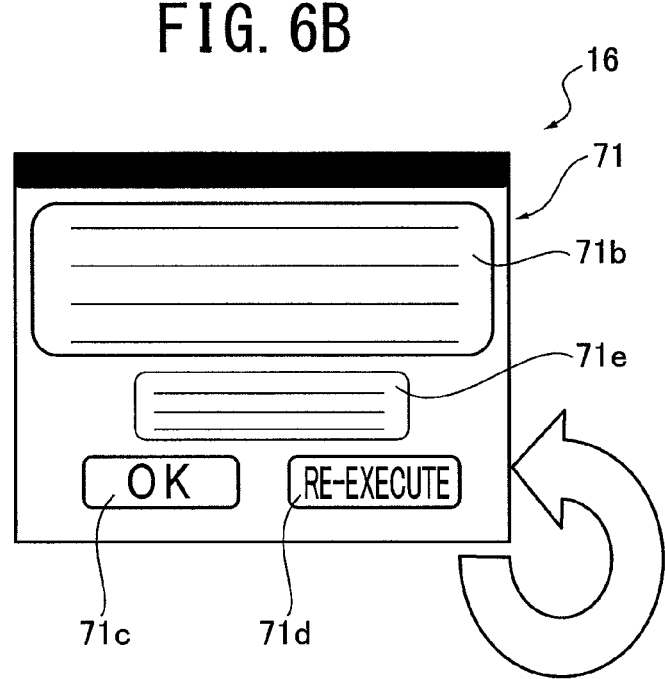

Referring to FIGS. 5, 6A and 6B, the self maintenance check aid function is executed under the control of the controller 28 of the control unit 27. For the purpose of maintaining the surveying device 10 properly, the user is allowed to select a desired item from maintenance items displayed on the display unit 16 to examine the concerning units and adjust various set values thereof. The details and results of examination and adjustment are also displayed on the display unit 16.

FIG. 5 is a flowchart showing a self maintenance check process executed by the controller 28, and FIG. 6A shows a maintenance item list on a self-check screen 71 on the display unit 16 and FIG. 6B shows the details and results of the self maintenance check thereon. Each step of the flowchart is described with reference to FIGS. 6A, 6B in the following.

In step S1 a maintenance item list 71a in FIG. 6A is displayed on the display unit 16. The items of the list include, for example, adjustment of set values of the respective units and examination of the respective units for normal operation.

In step S2 details of the item to be executed 71b (in FIG. 6B) are displayed on the display unit 16 and the current values of the item are stored in the memory 29 as a transmission file. In the present embodiment the self-check screen 71 includes check details 71b indicating the maintenance and adjustment procedures of the item in question which the user has to take and the details of automatic check operation of the device (FIG. 6B). The current values of the item are, for example, values before adjustment and stored in the memory 29 when needed. Preferably, in step S2 unfinished items are displayed in a predetermined order on the display unit 16 so that all the maintenance items registered are carried out in order. Alternatively, the items to be executed can be ones selected from the maintenance item list in step S1.

In step S3 a determination is made on whether or not the check operation performed on the respective units has been correctly executed. When the result is YES, the flow proceeds to step S4 and when the result is NO, the flow proceeds to step S5. In the present embodiment the self-check screen 71 includes an OK button 71*c* in FIG. 6B to complete the operation. Upon a user's manipulation of the OK button 71*c*, the check operation is determined to be completed, and the above determination is made. Alternatively, this determination by the OK button can be omitted depending on the item to be executed, for example, an automatic check operation such as tilt adjustment in step S53.

In step S4 the set values of the item adjusted by the check operation are stored in the memory 29 as a transmission file, and the flow proceeds to step S7.

In step S5 a determination is made on whether or not to execute the check operation. When the result is YES, the flow returns to step S2 and when the result is NO, the flow proceeds to step S6. In the present embodiment the self-check screen 71 includes a re-execute button 71*d* in FIG. 6B in addition to the OK button 71. Based on a user's manipulation of the OK button 71*c* or re-execute button 71*d*, the execution or re-execution of the check operation is determined.

In step S6, the result that the item displayed in step S2 has not been correctly executed is stored as a transmission file in the memory 29. The flow proceeds to step S11.

In step S7 following step S4, a determination is made on whether or not the adjusted values are within a defined range. When the result is YES, the flow proceeds to step S8 and when the result is NO, the flow proceeds to step S9. This determination is made by comparing the adjusted values with values defined for each maintenance item and stored in the memory 29.

In step S8 the result that the adjusted values in step S7 fall within the defined range is displayed on the display unit 16 and stored in the memory 29 as a transmission file. The flow proceeds to step S11. In the present embodiment a self-check result 71*e* is displayed on the self-check screen 71 of the display unit 16 in FIG. 6B.

In step S9 the result that the adjusted values in step S7 do not fall within the defined range is displayed on the display unit 16. Then, a determination is made on whether or not the check operation is executed again by a user's manipulation of the OK button 71*c* or re-execute button 71*d* in FIG. 6B. When the result is YES, the flow returns to step S2 and when the result is NO, the flow proceeds to step S10.

In step S10 since the check operation is not executed again, the result that the adjusted values in step S7 do not fall within the defined range is stored as a transmission file in the memory 29. Then, the flow proceeds to step S11.

In step S11 a determination is made on whether or not all the maintenance items registered are checked, irrespective of the results in the steps S3, S7. When the result is YES, the flow returns to step S12 and when the result is NO, the flow returns to step S2. In a case where step S2 is configured so that the details to be executed can be selected, in step S11 determination can be made on whether or not to end the self maintenance check operation. When the result is YES, the flow proceeds to step S12 and when the result is NO, the flow returns to step S10.

In step S12 the transmission files stored in the memory 29 are transmitted to the main server 42 via the communication unit 33, completing the self maintenance check process.

Thus, the results in the above steps are stored in the main server memory 47 in association with the identification data of the surveying device 10. If the details to be executed are selected in step S2, preferably, the details selected are also transmitted together with basic information such as the identification data of the surveying device 10, operating time data, position data, and software version data.

Note that for a simple operation check included in the maintenance items, steps S4 and steps S7 to S10 can be omitted from the flowchart in FIG. 5 and after step S3 or S6, the flow can proceed to step S11. This flowchart is merely an example of the self maintenance check operation and the details of the steps can be arbitrarily changed in accordance with the item to be checked.

In terms of the user's operation to the surveying device 10, the user selects to execute the self maintenance check aid function via the input unit 17 or on the display unit 16, to display the maintenance item list 71*a* on the display unit 16. Following the steps in the flowchart in FIG. 5, the user is guided to execute the self maintenance check operation, viewing the display unit 16.

Thus, the surveying device 10 allows the user to repetitively execute the check operation regarding all the maintenance items. It also transmits the details of the executed operation to the main server 42 in step S12. Accordingly, the input unit 17 and the display unit 16 function as a maintenance aid function.

Next, the troubleshooting aid function is described with reference to FIG. 7 to FIGS. 9A, 9B. The troubleshooting aid function is executed under the control of the controller 28 of the control unit 27 and aims to find the causes of a failure or a problem in the surveying of the surveying device 10 or the surveying unit at a preset accuracy. The items to select for specifying the causes are displayed on the display unit 16 together with solutions and procedures that the user is to execute.

Figure 7:
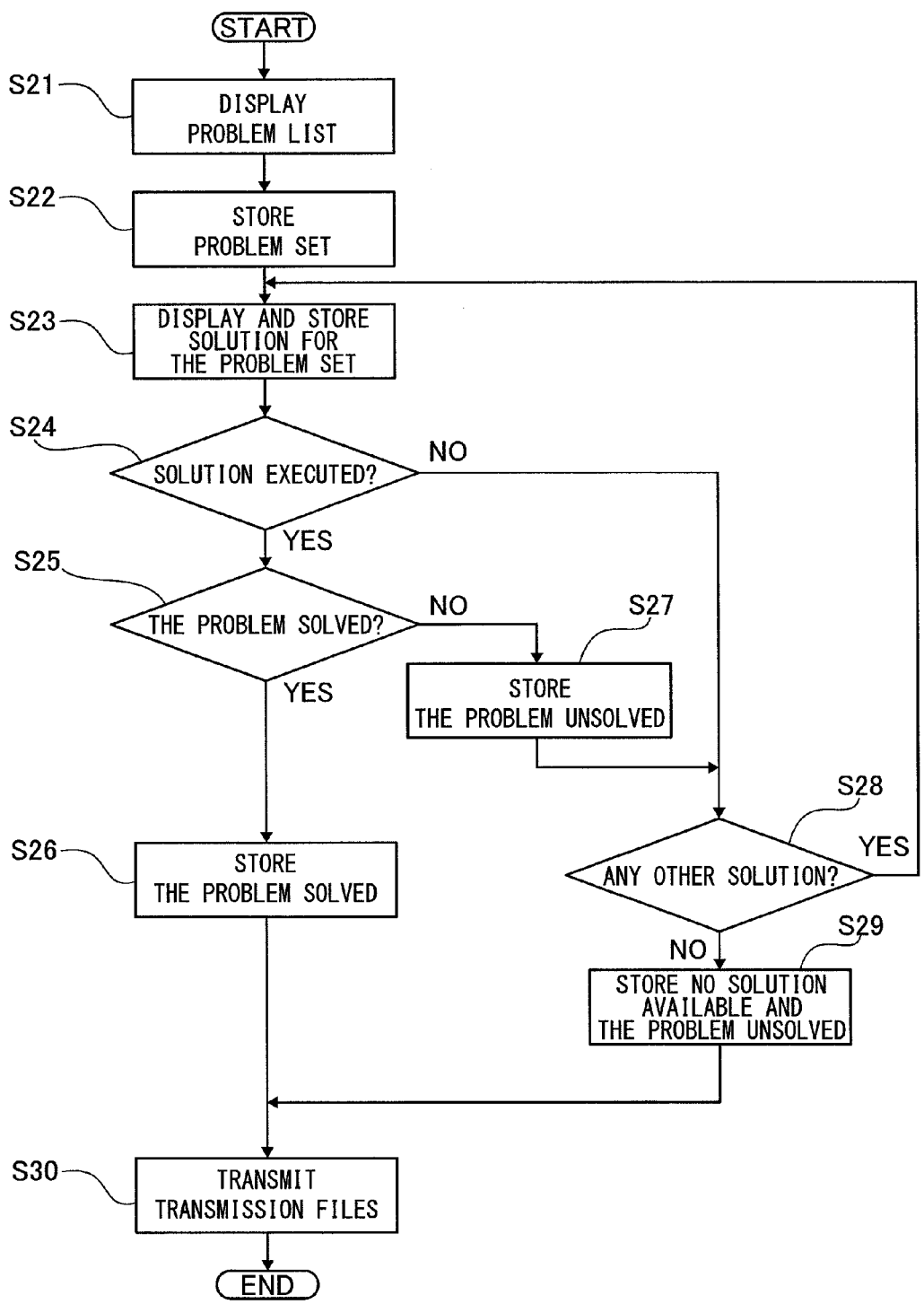
FIG. 7 is a flowchart for troubleshooting operation executed by the controller 28.
Figure 8:
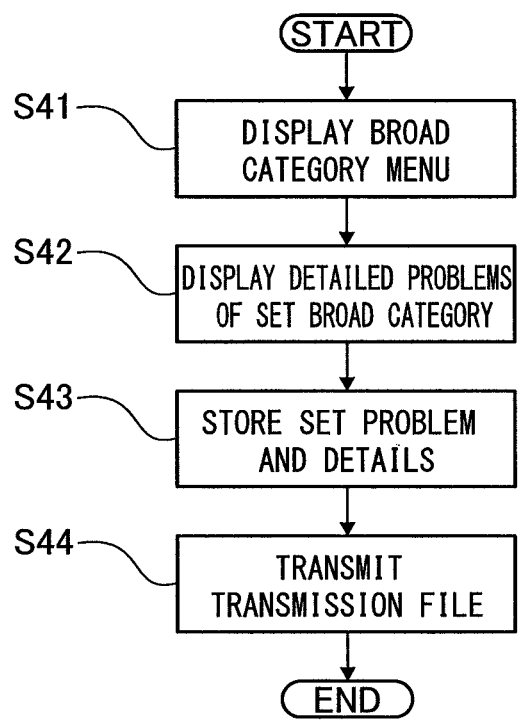
FIG. 8 is a flowchart for questionnaire creation operation executed by the controller 28.
Figure 9A:
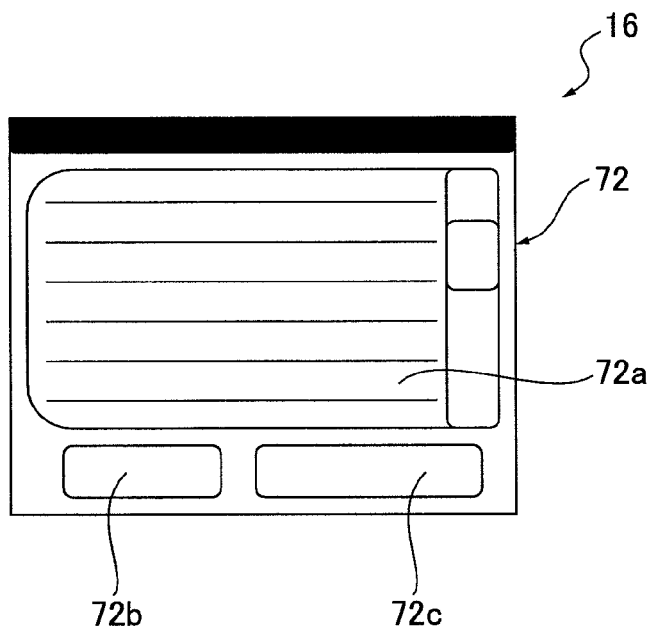
FIG. 9A shows a list of problems in the surveying device 10 on the display unit 16 and FIG. 9B shows solutions and choices on the display unit 16.
Figure 9B:
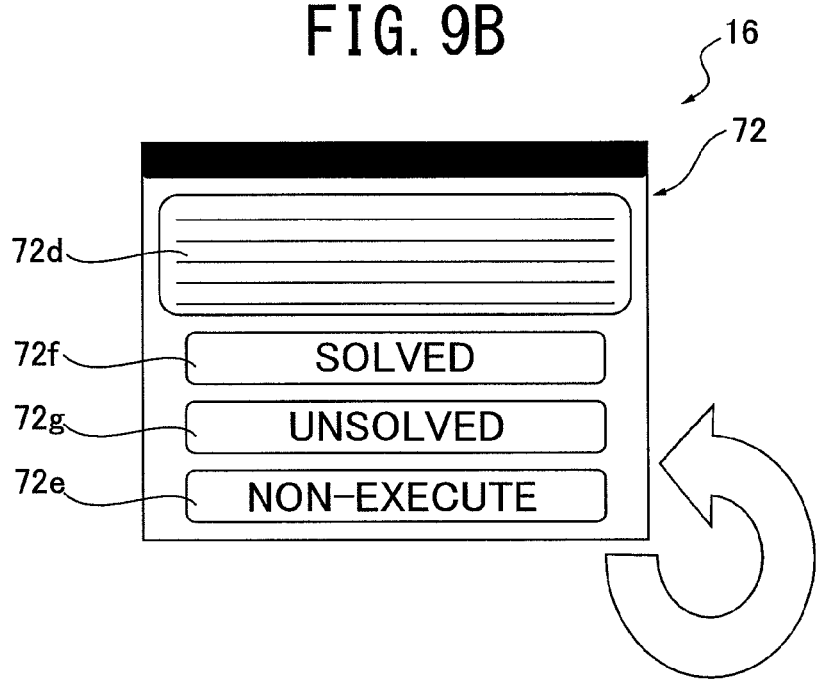

FIG. 7 is a flowchart for troubleshooting process executed by the controller 28 and FIG. 8 is a flowchart for questionnaire creation process. FIG. 9A shows a troubleshooting screen 72 on the display unit 16 on which a problem list is displayed while FIG. 9B shows the same on which solutions and procedures of the solutions are displayed. The flowcharts in FIGS. 7-8 are described referring to FIGS. 9A, 9B.

In step S21 a problem list 72*a* in FIG. 9A is displayed on the display unit 16. The problem list shows in what operation of the functions of the surveying device a problem or failure has occurred. The user is allowed to select the problem from the problem list 72*a*.

In step S22 the problem selected in step S21 is stored as a transmission file in the memory 29 and the flow proceeds to step S23. In the present embodiment an OK button 72*b* to confirm the selection and a cancel button 72*b* to cancel the selection are displayed on the troubleshooting screen 72 on the display unit 16. The selection of a problem is determined by the user's manipulation of the OK button 72*b* while any of the problem list is selected.

In step S23 solutions for the selected problem are displayed on the display unit 16, and stored as a transmission file in the memory 29, and the flow proceeds to step S24. In step S23 one of the solutions is selected and displayed. It is preferable to display the most likely solution for the selected problem. The most likely solution can be set on the basis of the tendency of problems occurring in the surveying device 10. The solutions for each of the problems are preset and stored in the memory 29 and displayed in order of execution. In the present embodiment solution details 72d in FIG. 9B indicating the procedures the user needs to follow are displayed on the display unit 16.

In step S24 a determination is made on whether or not the user intends to execute the displayed solution on the display unit 16. When the result is YES, the flow proceeds to step S25 and when the result is NO, the flow proceeds to step S28. In the present embodiment a non-execute button 72e to require another solution without executing the displayed solution is displayed on the troubleshooting screen 72 in FIG. 9B. With the button 72e selected, the displayed solution is not executed and with the button 72e not selected, the execution is withheld until step S25.

In step S25 a determination is made on whether or not the problem in question has been solved. When the result is YES, the flow proceeds to step S26, and when the result is NO, the flow proceeds to step S27. A solved button 72f and an unsolved button 72g are displayed on the display unit 16 in FIG. 9B. The problem in question is determined to be solved by a user's selection of the solved button 72f and determined to be unsolved by a user's selection of the unsolved button 72g.

In step S26 the solution to have solved the problem in step S25 is stored as a transmission file in the memory 29. The flow then proceeds to step S30.

In step S27 the solution having failed to solve the problem in step S25 is stored as a transmission file in the memory 29, and the flow proceeds to step S28.

In step S28 a determination is made on whether or not there are any other solutions stored in the memory 29 for the problem selected in step S22, except for the solution executed in step S23. When the result is YES, the flow returns to step S23, and when the result is NO, the flow proceeds to step S29.

In step S29 the result that there is no other solution in step S28 is displayed on the display unit 16 and stored as a transmission file in the memory 29. The flow then proceeds to step S30. In the present embodiment the solution details 72d indicating no other solution available is displayed on the troubleshooting screen 72 on the display unit 16.

In step S30 the transmission files stored in the memory 29 are transmitted to the main server 42 via the communication unit 33, thereby completing the troubleshooting process. Thus, the results obtained in step S22, S23, steps S26, S27, and step S29 are stored in the main server memory 47 in association with the identification data of the surveying device 10. It is preferable to transmit, to the main server 42, basic information such as the identification data of the surveying device 10, operating time data, position data, and software version data together with the identification data.

Note that the solution displayed in step S22 can be one of the maintenance items. A control program can be created to link the flowchart in FIG. 7 with the flowchart in FIG. 5 when appropriate.

In the troubleshooting aid function, it is preferable to allow the user to create a questionnaire instead of step S21. Thereby, it is possible to prevent the user from repetitively executing the steps S23 to S29 for each of selected solutions for the problem in question. The questionnaire creation process is described referring to FIG. 8. It is executed under the control of the controller 28 of the control unit 27.

Figure 13:
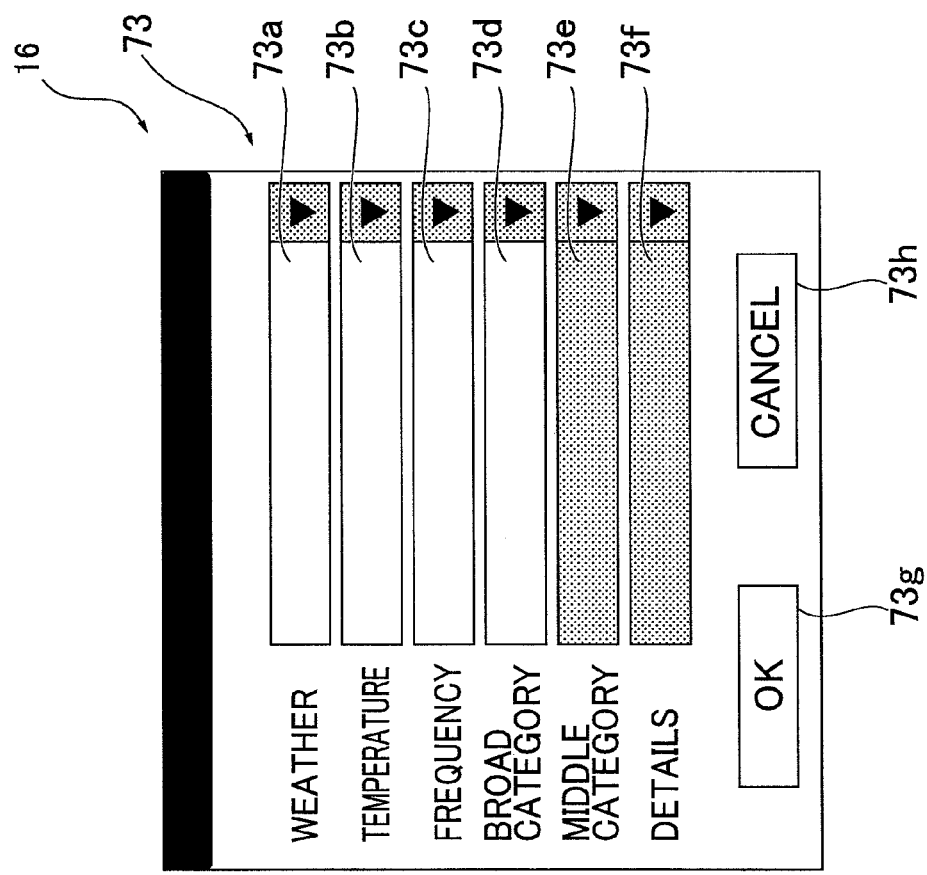
FIG. 13 shows a questionnaire creation aid screen 73.

In step S41 the user is allowed to select the broad category of a problem with a broad category 73d on the display unit 16 as shown in FIG. 13, for example. The broad category includes the functions of the surveying device 10 such as distance measuring function, angle measuring function, or automatic tracking function.

In step S42 the user is allowed to select one from a middle category 73e listing the details of the broad category on the display unit 16. The details can be, for example, a failure in the distance measuring function such as inability to survey, a variation in the measured distance, an abnormal or impossible survey result, or a failure in the angle measuring function such as an error as a double angle difference, a difference in normal and reverse measurement, a difference between the maximum and minimum values of the normal and reverse measurement, and else.

In step S43 the detail selected in step S42 is stored as a transmission file in the memory 29.

In step S44 the transmission file stored in the memory 29 is transmitted to the main server 42 via the communication unit 33, thereby completing the questionnaire creation process. Thus, it is made possible for the user to create the questionnaire properly and store questionnaire data in the main server memory 47 in association with the identification data of the surveying device 10. The flowchart of FIG. 8, the input unit 17 and the display unit 16 constitute a questionnaire creation aid function. In the present embodiment the problem to solve is classified in the two categories in step S41 and S43. However, the problem to solve can be classified in three or more categories to create a more accurate questionnaire.

With the surveying device 10, when the user operates the input unit 17 or the display unit 16 to execute the troubleshooting aid function, the problem list 72a is displayed as in step S21 of the flowchart in FIG. 7. Alternatively, in replace of step S21, the questionnaire can be created, following the flowchart in FIG. 8.

Then, following the step S22 to S25 in FIG. 7, the solution details 72d for the selected problem are displayed on the display unit 16 together with the solved button 72f to indicate that the problem has been solved and the unsolved button 72g to indicate that the problem has not been solved. The user selects one of the buttons 72e, 72f, 72g.

With the solved button 72f selected, the surveying device 10 completes the troubleshooting process.

With the unsolved button 72g selected, a determination is made on whether or not there are any other solutions in steps 27, 28 of FIG. 7, and another available solution or the result that another solution is unavailable is displayed on the display unit 16 in step S23 or step S29.

Likewise, with the non-execute button 72e selected and another solution requested, a determination is made on whether or not there is any other solution in steps 24 to 28, and another available solution or the result that another solution is unavailable is displayed on the display unit 16 in step S23 or step S29.

Thus, with the surveying device 10, the user can find the solution for the problem in proper surveying and the procedures of the solution, or execute troubleshooting. The surveying device 10 transmits the details of the operation executed in the troubleshooting aid function to the main server 42 in step S30. Thus, the flowchart in FIG. 7 and the display unit 16 and the input unit 17 constitute a troubleshooting aid function to guide the user to find and execute the solution.

Figure 10:
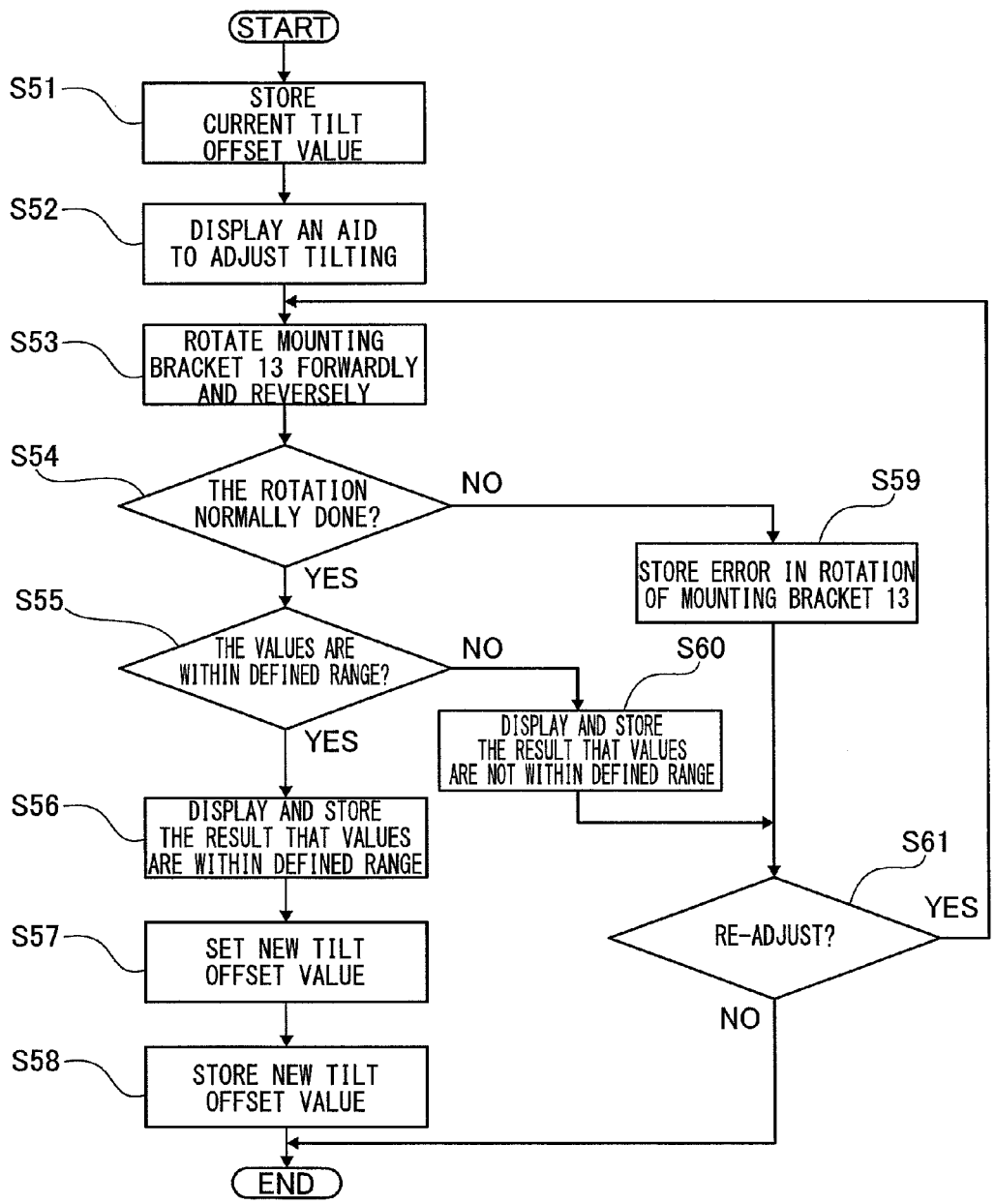
FIG. 10 is a flowchart for adjusting a tilt offset value as an example of the self maintenance check aid function.

Next, examples of the self maintenance check aid function and questionnaire creation aid function are described. As described above, there are two kinds of the self maintenance check, i.e., the adjustment of set values and simple operation checks. First, the adjustment of a tilt offset value as an example of the self maintenance check aid function is described with reference to FIG. 10. The tilt offset value is to correct the position of the surveying device 10 set in a desired place to an accurate horizontal position. FIG. 10 omits the display of the maintenance item list equivalent to step S1 in FIG. 5.

In step S51 a current tilt offset value (before adjusted) is stored as a transmission file in the memory 29.

In step S52 a message to induce the user to execute the tilt adjustment is displayed on the display unit 16 until 30 seconds are counted, for example. The user is allowed to operate the adjustment mechanism on the base 12 so that the reference position of the telescopic unit 14 is adjusted to be horizontal to the leveling unit 11. The counted time can be arbitrarily set to a time enough to execute the adjustment.

In step S53 in 30 seconds after the display in step S52, the device 10 is checked if it is in a horizontal state by rotating the mounting bracket 13 by the horizontal driver 23 relative to the base 12 to the reference position forwardly, horizontally and then rotating it reversely. Values acquired here are stored as a transmission file in the memory 29.

In step S54 a determination is made on whether or not the mounting bracket 13 is rotated properly and correctly. When the result is YES, the flow proceeds to step S55 and when the result is NO, the flow proceeds to step S59. Steps S51 to S54 correspond to steps S2 to S3 in FIG. 5.

In step S55 a determination is made on whether or not the acquired values in step S54 are in a defined range by comparing them with defined values stored in the memory 29. When the result is YES, the flow proceeds to step S56 and when the result is NO, the flow proceeds to step S60. Step S55 corresponds to step S7 in FIG. 5.

In step S56 the result that the acquired values are in a defined range is displayed on the display unit 16 and stored as a transmission file in the memory 29. Step S56 corresponds to step S8 in FIG. 5.

In step S57 new tilt offset values are set on the basis of the acquired values. The tilt offset values can be set in a conventional manner, therefore, a description thereof is omitted.

In step S58 the new tilt offset values are stored in the memory 29, thereby completing the adjustment of the tilt offset values.

In step S59 a failure that the mounting bracket 13 has not been properly rotated forwardly or reversely in step S53 is stored as a transmission file in the memory 29. Step S59 correspond to step S6 in FIG. 5. Here, different from the operation in FIG. 5, the error in step S53 is stored before re-adjusting the tilting since the operation in step S53 is an automatic check operation and a failure therein means an error in the surveying device 10 itself.

In step S60 the result that the acquired values are not within a defined range is displayed on the display unit 16 and stored as a transmission file in the memory 29.

In step S61 a determination is made on whether or not to adjust the tilt offset values again. When the result is YES, the flow returns to step S52 and when the result is NO, the negative result is stored as a transmission file in the memory 29, completing the tilt offset value adjustment process. Step S61 corresponds to step S5 or S9 in FIG. 5.

The transmission files in the memory 29 are transmitted to the main server 42 via the communication unit 33 and stored in the main server memory 47 in association with the identification data of the surveying device 10, the same as in FIG. 5.

With the surveying device 10, the user operates the input unit 17 or the display unit 16 to execute the tilt offset value adjustment of the self maintenance check aid function and is guided to execute the operation in the flowchart in FIG. 10, viewing the display unit 16.

Thus, with the surveying device 10, the user is allowed to adjust the tilt offset value and the adjustment results are transmitted to the main server 42.

Figure 11:
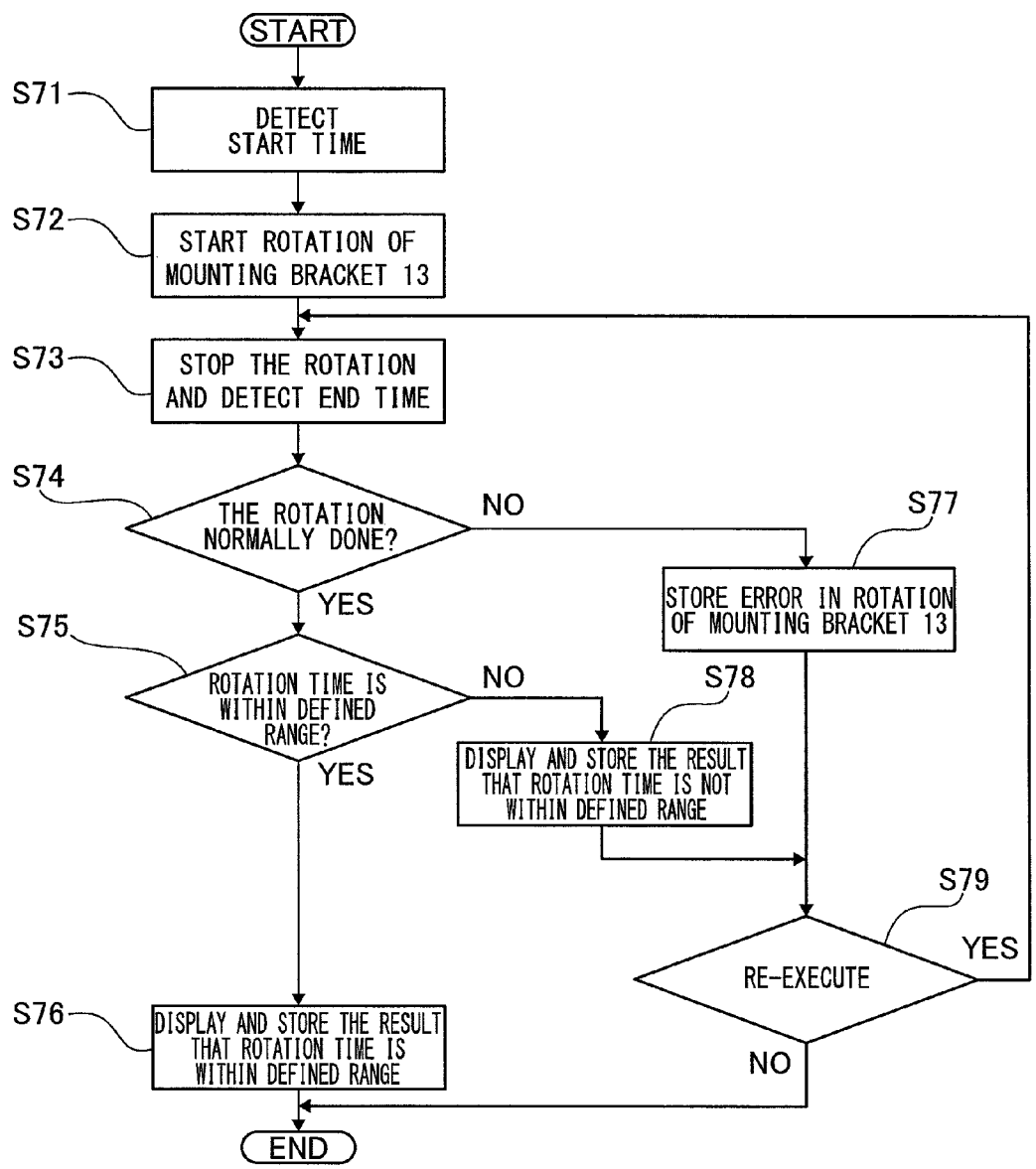
FIG. 11 is a flowchart for checking the rotation time of a mounting bracket 13 relative to a base 12 as an example of a simple operation check of the self maintenance check aid function.

Next, the simple operation check of the self maintenance check aid function is described. FIG. 11 shows the operation in which the rotation time of the mounting bracket 13 relative to the base 12 is checked. The rotation time is a time taken for the mounting bracket 13 to make a full rotation relative to the base 12 horizontally and represents the horizontal rotary velocity of the mounting bracket 13.

In step S71 a time at which the check operation is started is detected.

In step S72 at the start time the horizontal driver 23 starts the rotation of the mounting bracket 13 from the reference position to the reference position relative to the base 12.

In step S73 the rotation of the mounting bracket 13 is stopped and the stop time is detected.

In step S74 a determination is made on whether or not the mounting bracket 13 has been normally rotated around. When the result is YES, the flow proceeds to step S75, and when the result is NO, the flow proceeds to step S77. Steps S71 to S74 correspond to steps S2 to S3 in FIG. 5.

In step S75 a determination is made on whether or not the rotation time is in a defined range by comparing an actual rotation time with defined values stored in the memory 29. The actual time rotation time is calculated by subtracting the start time in step S71 from the stop time in step S73. Step S75 corresponds to step S7 in FIG. 5.

In step S76 the result that the rotation time is in a defined range is displayed on the display unit 16 and the result and the actual rotation time are stored as a transmission file in the memory 29. This completes the rotation time check operation concerning the mounting bracket 13. Step S76 corresponds to step S8 in FIG. 5.

In step S77 an error that the mounting bracket 13 has not been properly rotated in step S74 is stored as a transmission file in the memory 29. The error represents what operation of the rotation time detection has failed. Step S79 corresponds to step S6. Here, different from the operation in FIG. 5, the error in step S53 is stored before re-checking the rotation time since the operation in step S53 is an automatic check operation and a failure therein means an error in the surveying device 10 itself.

In step S78 the result that the rotation time is not within a defined range in step S75 is displayed on the display unit 16 and stored as a transmission file in the memory 29.

In step S79 a determination is made on whether or not to re-check the rotation time. When the result is YES, the flow returns to step S71, and when the result is NO, the negative result is stored as a transmission file in the memory 29, completing the rotation time check operation. Step S79 correspond to step S7 or S9 in FIG. 5.

The transmission files stored in the memory 29 are transmitted to the main server 42 via the communication unit 33 and stored in the main server memory 47 in association with the identification data of the surveying device 10, as in the operation in FIG. 5.

As described above, with the surveying device 10, the user operates the input unit 17 or the display unit 16 to select the checking of the rotation time of the mounting bracket 13 from the self maintenance check aid function, and is guided to execute the operation in the flowchart in FIG. 11, viewing the display unit 16.

Thus, with the surveying device 10, the user is allowed to check the rotation time and the check results are transmitted to the main server 42.

Figure 12:
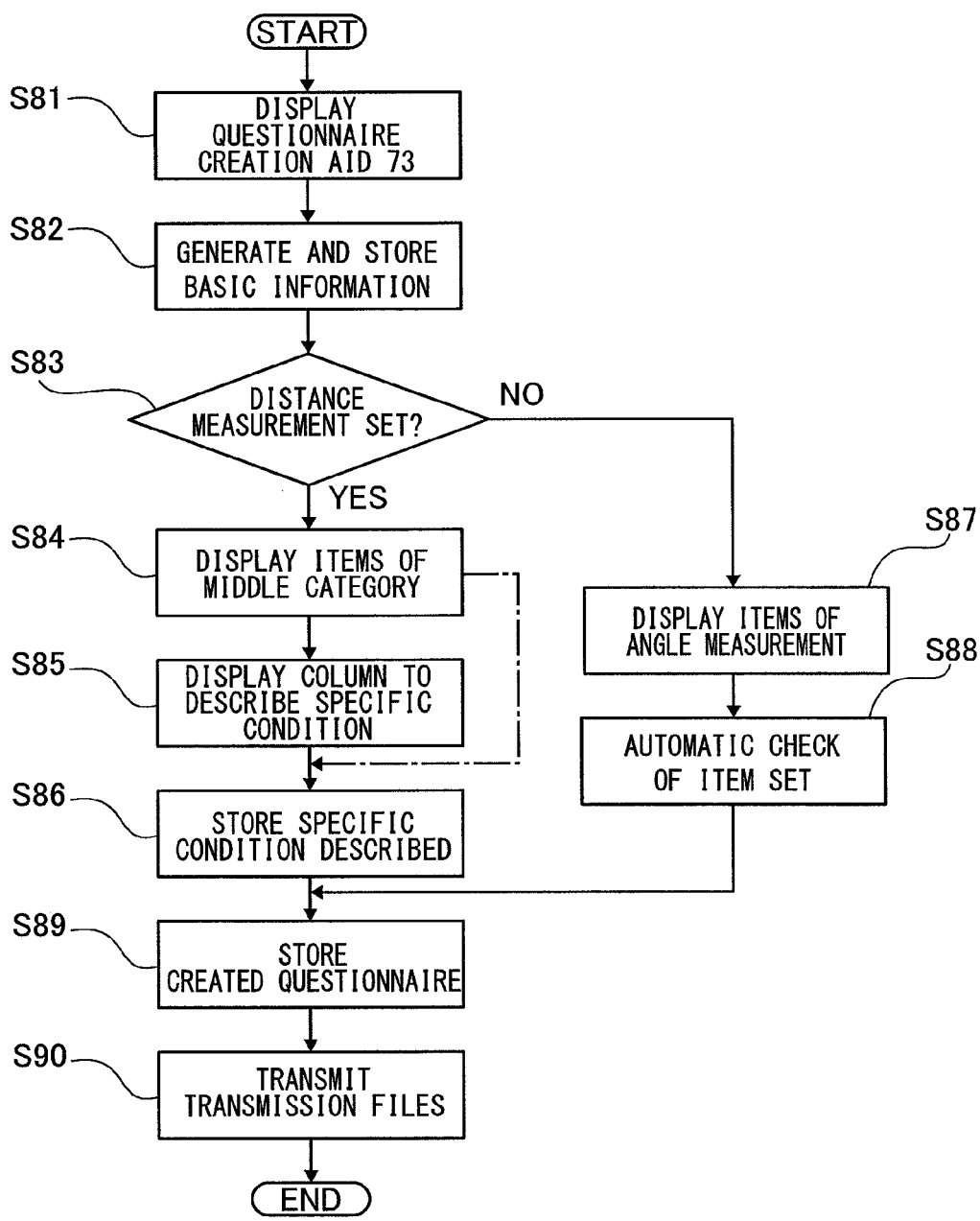
FIG. 12 is a flowchart for questionnaire creation aid function by way of example.

Next, an example of the questionnaire creation aid function of the surveying device 10 is described. FIG. 12 shows the operation in a questionnaire creation process by way of example. For the sake of simplicity, only two functions, distance measurement and angle measurement are set in a broad category. A flowchart in FIG. 12 is described referring to FIG. 13.

In step S81 a questionnaire creation aid screen 73 in FIG. 13 is displayed on the display unit 16. The questionnaire creation aid screen 73 includes a weather button 73a, a temperature button 73b, a frequency button 73c, a broad category 73d, a middle category 73e, a details button 73f, an OK button 73g, and a cancel button 73h. These buttons are pull-down menus. The weather button 73a is for setting current weather in ambient environment in which the surveying device 10 is placed. The temperature button 73b is for setting a current temperature. The device can be configured to include a temperature detector to detect an ambient temperature and set the detected value to a current temperature. The frequency button 73c is for setting a frequency at which a problem concerned occurs. The broad category 73d corresponds to the broad category of a problem in step S41 in FIG. 8. The middle category 73e and details button 73f correspond to the details in step S42. The middle category 73e is subordinate to the broad category 73d, and the details button 73f is subordinate to the middle category 73e. The middle category 73e and details button 73f become settable when the broad category 73d and middle category 73e are set, respectively.

In step S82 basic information is generated and stored as a transmission file in the memory 29 together with the information set with the weather button 73a, temperature button 73b, and frequency button 73c. The basic information refers to the identification data of the surveying device 10, operating time data, position data, and software version data as described above.

In step S83 a determination is made on whether or not the distance measurement is set in the broad category 73d. When the result is YES, the flow proceeds to step S84, and when the result is NO and the angular measurement is set, the flow proceeds to step S87.

In step S84 the problems in the middle category 73e are displayed on the display unit 16 to allow the user to select one. Additionally, the details of the problem can be also set with the details button 73f. The middle category 73e includes problems such as inability to survey, a variation in the measured distance, and an abnormal or impossible survey result. When the surveying has failed, the flow skips step S85 and proceeds to step S86, as indicated by an alternate long and short dash line.

In step S85 a column to describe a specific situation in which the problem set in the middle category has occurred is displayed on the display unit 16. The specific situation is, for example, that when an error in a measured value is set in step S84, how or by what manipulation an error was found specifically. The specific situation can be set with the details button 73f. By a user's manipulation of the OK button 73g, completion of describing the specific situation is determined.

In step S86 the contents of the column are stored as a transmission file in the memory 29. Thus, the middle category of the distance measurement is specified and a questionnaire for the problem in the middle category is created.

In step S87 following step S83 in which the angle measurement has been set, the problem list of the middle category 73e of the angle measurement is displayed on the display unit 16. As in step S84, the details of the problem can be also set with the details button 73f. The middle category includes problems such as error in horizontal angle, error in altitude, and the like.

In step S88 the problem set in step S87 is automatically checked or self-examined, and the checked details and values are stored as a transmission file in the memory 29. The problem automatically checked is for example the automatic rotation of the mounting bracket 13 relative to the base 12 described above. Thus, it is possible to specify the problem in the middle category, acquire a self-examination result and create a questionnaire for the problem.

In step S89 the created questionnaire is stored as a transmission file in the memory 29.

In step S90 the transmission files stored in the memory 29 are transmitted to the main server 42 via the communication unit 33, thereby completing the questionnaire creation process. Thus, the user can create a proper questionnaire and data on the questionnaire is stored in the main server memory 47 in association with the identification data of the surveying device 10.

In FIG. 10 when the distance measurement is set, a request for describing a specific situation is issued and the specific situation is stored in steps S85 to S86 while when the angle measurement is set, a self-examination is executed in step S88 by way of example. However, the present invention is not limited to such an example. Alternatively, the self-examination can be executed when the distance measurement is set or the request can be issued when the angle measurement is set.

As described above, with the surveying device 10, the user operates the input unit 17 or the display unit 16 to execute the questionnaire creation aid function and is guided to execute the operation in the flowchart in FIG. 12, viewing the display unit 16.

Thus, with the surveying device 10, it is made possible for the user to create a proper questionnaire and the surveying device 10 can transmit the results of the questionnaire creation process to the main server 42.

As described above, the operations executed in the self maintenance check aid function, troubleshooting aid function, or questionnaire creation aid function are transmitted to the main server 42 via the communication unit 33, and stored in main server memory 47 in association with the identification data of the surveying device 10, as shown in FIG. 3.

Meanwhile, the terminals 44 can individually access the main server 42 via the web server 43. The web server 43 restricts the area of data accessible by each terminal so that all the data stored in the main server memory 47 cannot be freely seen with the terminals 44.

For example, assumed that the terminal 441 is a manufacturer of the surveying device, they are allowed to see device data such as the model numbers of their products. If the terminal 442 is a dealer of the device, they are allowed to see device data such as the stock numbers of products they sold.

In a case where their products are designated in the two columns 62b1, 62b2 of the product designation column 62b, the terminal 441 can select either or both of the columns and acquire data on the details of the self maintenance check aid function and troubleshooting aid function executed, and the created questionnaire by operating the product designation 62 on the menu screen 61 in FIG. 4. In addition, they can see the basic information, error data, and operating time data obtained during the execution of these functions.

Similarly, the terminal 442 can acquire data on the details of the self maintenance check aid function and troubleshooting aid function executed, and the created questionnaire by designating the stock number of their product on the menu screen 61 and can see the basic information, error data, and operating time data obtained during the execution of these functions.

Thus, the surveying device 10 according to the present embodiment can transmit the operation status information to the outside network when appropriate, which allows relevant parties such as dealers or manufacturers to acquire the operation status information on the surveying device 10 or the current usage status and condition of the device quickly.

Further, the surveying device 10 can transmit the operation information to the outside network in addition to the operation status information so that the relevant parties can more accurately know the current usage status and condition of the device. For example, they can accurately know the causes of a problem in surveying a target point by comparing the error data with the operation status information.

Further, the transmission of the basic information to the outside network makes it possible for the relevant parties to more accurately know the current usage status and condition of the device. For example, they can more accurately know the causes of a problem in surveying a target point by comparing ambient information as temperature, humidity with the operation status information since the ambient condition under which the surveying device 10 is placed can greatly affect of the operation thereof.

Further, the relevant parties can use the operation status information, operation information, and basic information transmitted from the surveying device 10 to study the causes of a problem occurring from various viewpoints and specify the problem accurately.

The self maintenance check aid function of the surveying device 10 makes it easier for the user to properly execute the self maintenance check. Also, the surveying device 10 can allow the user to know his/her errors in the use of the device such as setting failures.

Further, the relevant parties can use the processing details of the self maintenance check aid function transmitted from the surveying device 10 to more accurately know the current usage status and condition of the device.

The questionnaire creation aid function of the surveying device 10 makes it easier for the user to create a proper questionnaire accurately reflecting a problem in surveying, for example, how and in what operation of which measuring function the problem has occurred.

Further, the relevant parties can use the processing details of the questionnaire creation aid function transmitted from the surveying device 10 to accurately and quickly know how and in what operation of which measuring function the problem has occurred.

The troubleshooting aid function of the surveying device 10 can provide a solution for the problem to the user and allow the user to easily and properly execute the solution.

Further, the relevant parties can use the processing details of the troubleshooting aid function transmitted from the surveying device 10 to accurately and quickly know the situation in which the problem in surveying has occurred and acquire information on whether or not the solution provided for the problem was effective.

In the communication system 40 for the surveying device 10, by using the terminal 44 to obtain the operation status information on the surveying device 10, the dealer or manufacturer of the surveying device 10 can quickly know the cause of a problem in surveying and can promptly provide solutions for the problem to the user.

In the communication system 40, by using the terminals 44 to obtain the operation status information on a plurality of surveying devices 10, the dealers or manufacturers of the devices to quickly know the current usage statuses or conditions of the individual surveying devices 10.

For example, using the terminals 44, the dealers or manufacturers can accurately know the causes of a problem by comparing the error data with the operation status information and provide proper solutions for the problem to the user. Also, they can find a tendency of errors from various accumulated data in the surveying device 10 and calculate mean time between failures (MTBF) to check the reliability and quality of the surveying device 10. They can specifically know from the accumulated data the ambient environment under which the surveying device 10 is used.

In the communication system 40 the terminals 44 can obtain the basic information on a plurality of surveying devices 10, which allows the dealers or manufacturers of the device to more accurately and quickly know the current usage status or condition of each surveying device 10 and the cause of a problem in surveying by comparing the ambient information as temperature, humidity with the operation status information. Accordingly, they can promptly provide the user with proper solutions for the problem.

Further, with the communication system 40, the dealers or manufacturers can use the operation status information, operation information, and basic information obtained with the terminals 44 to more accurately know the current usage status and condition of each surveying device 10 and study the causes of a problem in surveying a target from various viewpoints and specify the causes of the problem accurately.

In the communication system 40, using the terminals 44, the dealers or manufacturers can obtain data on each maintenance items regarding aging deterioration or setting change or the like from the accumulated data in the surveying devices 10 so as to notify the user of that before a failure occurs. Such a notification can be made from the main server 42 or directly from a manufacturer or a dealer with the terminals 44 via the communication unit 33.

In the communication system 40, using the terminals 44, the manufacturers or dealers can acquire the processing details of the questionnaire creation aid function as the operation status information, for example, to accurately and quickly know how, in what circumstances, or in what operation the problem has occurred. Accordingly, they can provide solutions for the problem to the user quickly.

With the communication system 40, using the terminals 44, the manufacturers or dealers can acquire the processing details of the troubleshooting aid function as the operation status information, to accurately and quickly know the situation in which the problem in surveying has occurred and acquire information on whether or not the solution provided for the problem was effective.

The above embodiments have described the structure of the surveying device 10 by way of example. However, the present invention should not be limited to such an example. It can be arbitrarily configured as long as it comprises a surveying unit configured to measure a direction and a distance to a target object, a control unit configured to control the surveying unit, a communication unit configured to allow the control unit to communicate with an outside network, and a status input unit with which operation status information on the surveying unit is input, in which the control unit transmits the operation status information input with the status input unit to the outside network via the communication unit.

The above embodiments have described the structure of the communication system 40 for the surveying device 10 by way of example. However, the present invention should not be limited to such an example. It can be arbitrarily configured as long as it comprises a surveying device comprising a surveying unit to measure a direction and a distance to a target object and a control unit to control the surveying unit, to transmit operation status information on the surveying unit to the outside network, a main server configured to receive the operation status information from the surveying device via the outside network and store the operation status information in association with identification data of the surveying device, a terminal configured to acquire the operation status information associated with the identification data of the surveying device, and a data area setting unit configured to network-connect the terminal and the main server and set an accessible area in the operation status information stored in the main server on the basis of identification data of the terminal.

The above embodiments have described an example of the self maintenance check aid function executed following the flowchart in FIG. 5. However, the present invention should not be limited to such an example. It can be arbitrarily configured as long as the user can select a maintenance item on the display unit 16 to see the details and results of examination or value adjustment for the purpose of examining the parts and units of the surveying device 10 and adjusting various set values.

The above embodiments have described an example of the troubleshooting aid function executed following the flowchart in FIG. 7. However, the present invention should not be limited to such an example. It can be arbitrarily configured as long as items to specify a problem, solutions for the problem, and an operation procedure the user has to follow are displayed on the display unit 16.

The above embodiments have described an example of the questionnaire creation aid function executed following the flowchart in FIG. 8. However, the present invention should not be limited to such an example. It can be arbitrarily configured as long as the user is guided to create a questionnaire.

The above embodiments have described an example of the communication system 40 for the surveying device in which the terminal 44 receives various information from the surveying device 10. However, the present invention should not be limited to such an example. Alternatively, it can be configured that the terminal 44 or the main server 42 transmits information to the surveying device 10 to perform maintenance of the surveying device 10 or update programs stored therein.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A surveying device comprising:
    a surveying unit configured to measure a direction and a distance to a target object;
    a control unit configured to control the surveying unit;
    a communication unit configured to allow the control unit to communicate with an outside network; and
    a status input unit with which operation status information on the surveying unit is input,
    wherein the control unit transmits the operation status information input with the status input unit to the outside network via the communication unit,
    wherein the control unit includes a questionnaire creation aid function to guide a user to create a questionnaire about the surveying unit in cooperation with the input unit when the surveying unit fails to properly survey the target object, and
    wherein the control unit transmits the questionnaire to the outside network as the operation status information.

2. The surveying device according to claim 1, further comprising:
    an information acquiring unit configured to acquire operation information on the surveying unit,
    wherein the control unit transmits the operation information acquired by the information acquiring unit to the outside network via the communication unit.

3. The surveying device according to claim 1, wherein the control unit includes a maintenance aid function to guide a user to perform maintenance of the surveying unit in cooperation with the input unit, and transmits a maintenance operation executed by the maintenance aid function as the operation status information.

4. The surveying device according to claim 1, wherein the control unit includes a troubleshooting aid function to guide a user to find a solution for a problem of the surveying unit and execute the found solution, and transmits the found and executed solution as the operation status information.

5. The surveying device according to claim 1, wherein the surveying unit includes a ranging unit to irradiate the target object with a light beam and receive light reflected from the target object to measure a distance to the target object, and an angle measuring unit to detect an irradiation direction of the light beam.

6. The surveying device according to claim 1, wherein the surveying unit includes a leveling unit to detect an inclination of the surveying unit and a collimation system to collimate the target object.

7. A communication system for a surveying device, comprising:
    a surveying device comprising a surveying unit to measure a direction and a distance to a target object and a control unit to control the surveying unit, to transmit operation status information on the surveying unit to an outside network;
    a main server configured to receive the operation status information from the surveying device via the outside network and store the operation status information in association with identification data of the surveying device;
    a terminal configured to acquire the operation status information associated with the identification data of the surveying device; and
    a data area setting unit configured to network-connect the terminal and the main server and set an accessible area in the operation status information stored in the main server on the basis of identification data of the terminal,
    wherein the control unit includes a questionnaire creation aid function to guide a user to create a questionnaire about the surveying unit in cooperation with the input unit when the surveying unit fails to properly survey the target object, and
    wherein the control unit transmits the questionnaire to the outside network as the operation status information.

* * * * *